US 8,458,383 B1

(12) United States Patent
Wortman et al.

(10) Patent No.: US 8,458,383 B1
(45) Date of Patent: Jun. 4, 2013

(54) FLEXIBLE INTERFACE FOR STACKED PROTOCOL IN A PROGRAMMABLE INTEGRATED CIRCUIT DEVICE

(75) Inventors: Curt Wortman, San Jose, CA (US); Chong H. Lee, San Ramon, CA (US); Divya Vijayaraghavan, Mountain View, CA (US); Ning Xue, Fremont, CA (US)

(73) Assignee: Altera Corporation, San Jose, CA (US)

(*) Notice: Subject to any disclaimer, the term of this patent is extended or adjusted under 35 U.S.C. 154(b) by 1239 days.

(21) Appl. No.: 11/848,016

(22) Filed: Aug. 30, 2007

(51) Int. Cl.
*G06F 13/14* (2006.01)
*G06F 15/16* (2006.01)

(52) U.S. Cl.
USPC .......................................... 710/62; 709/230

(58) Field of Classification Search
USPC .......................................................... 710/62
See application file for complete search history.

(56) References Cited

U.S. PATENT DOCUMENTS

| 5,903,754 | A  | * | 5/1999  | Pearson ...................... 719/310 |
| 7,281,077 | B2 | * | 10/2007 | Woodral ..................... 710/310 |
| 7,489,707 | B2 | * | 2/2009  | Pung et al. .................. 370/469 |
| 2004/0264503 | A1 | * | 12/2004 | Draves, Jr. .................. 370/469 |
| 2005/0120122 | A1 | * | 6/2005 | Farnham ..................... 709/230 |

* cited by examiner

*Primary Examiner* — Henry Tsai
*Assistant Examiner* — Titus Wong
(74) *Attorney, Agent, or Firm* — Ropes & Gray LLP

(57) ABSTRACT

On programmable device, each layer of a programmable interface, for a protocol which has a protocol stack including at least a physical layer, a data link layer and a transaction layer, is selectably bypassable. When a layer is bypassed, all other layers downstream of that layer also are bypassed. In addition, the interface may be divided into different clock domains running at different clock rates, reflecting clock rates within the programmable device and outside the programmable device. Layers may be bypassed to allow a user to substitute a custom layer in programmable logic, or to substitute an updated layer for debugging purposes.

22 Claims, 7 Drawing Sheets the programmable fabric. The adapter FIFO circuit also can be used to adapt for rate differences. Preferably, the adapter FIFO is asynchronous, and may be used, if necessary, as a simple phase compensation FIFO. The ratio of the data rate within the interface to the data rate in the programmable fabric could be at least as much as 2:1—e.g., a data rate within the interface of about 500 MHz and a data rate in the programmable fabric of about 250 MHz—and, depending on the application, could be as much as 8:1.

At least one additional FIFO may be provided to bridge rate differences within the interface or between the interface and the external communications channel. This additional FIFO also may operate asynchronously, and could support a rate difference of as much as 16:1—e.g., 500 MHz vs. 31.25 MHz.

Thus, in accordance with the present invention, there is provided a stacked protocol interface for a programmable integrated circuit device. The stacked protocol interface includes a protocol stack including a plurality of layers progressing from a stack input to a stack output, each of the layers having a layer input and a layer output. There is a respective selectable bypass at the layer input of each of at least one of those layers. Signals arriving at that layer input are selectably directed to one of (a) the respective layer, and (b) the respective bypass.

FLEXIBLE INTERFACE FOR STACKED PROTOCOL IN A PROGRAMMABLE INTEGRATED CIRCUIT DEVICE

BACKGROUND OF THE INVENTION

This invention relates to an interface for a stacked protocol for use in a programmable integrated circuit device.

It has become common to include embedded high-speed serial interfaces in programmable integrated circuit devices such as programmable logic devices (PLDs), programmable microcontrollers, etc. Because the use to which a programmable device may be put by an end user cannot be determined when the device is manufactured, it is common to provide interfaces for more than one protocol. However, while some parameters of such interfaces may be controllable, the user nevertheless must use the interface substantially as provided, or else construct his own complete interface from the generally slower programmable logic available on the device.

SUMMARY OF THE INVENTION

The invention is particularly adapted to interfaces for stacked signalling protocols—i.e., protocols that include a protocol "stack" of several "layers." One such protocol is the PCI-Express (PCIe) protocol which has a protocol stack including at least a physical layer, a data link layer and a transaction layer.

When such an interface is used in a fixed integrated circuit device, such as an application-specific integrated circuit (ASIC), the interface may be customized as needed and then provided in a fixed condition along with the remainder of the fixed integrated circuit device. This includes configuring the interface to deal with data rate differences between the communication channel and the circuitry of the integrated circuit device.

However, in a programmable integrated circuit, such as a PLD, the use to which a user may put the device cannot be known at the time of device manufacture. Therefore, the interface should be configurable to allow it to operate with a wide range of possible user configurations, as well as the aforementioned data rate differences.

Therefore, the present invention provides an interface for a stacked protocol such as PCIe (although it is applicable to any stacked protocol), which includes modules for the various protocol layers, and in which those modules are selectably bypassable. The different bypass modes may be set at initial configuration of the programmable device, or may be dynamically selectable by signals generated during operation of the device by user-defined "soft" logic.

This may allow user customizations that require bypassing specific layers of the protocol, or substitution of alternative implementations of those layers which may be provided in the user logic. In addition, if a defect or "bug" is discovered in the interface, the affected layers may be bypassed and a substitute module, in which the defect or bug has been corrected, can be provided in the soft logic. This allows part of the hard-logic protocol stack, which is more efficient in terms of power consumption and die area, to be used, and also reduces timing closure hot spots, as compared to having to recreate the entire interface in soft logic.

The various bypass paths may be multiplexed so that they can share the same input/output connections to the programmable portion or "fabric" of the programmable integrated circuit device.

In addition, an adapter FIFO circuit is provided to bridge phase and/or frequency differences between the interface and

BRIEF DESCRIPTION OF THE DRAWINGS

Further features of the invention, its nature and various advantages, will be apparent upon consideration of the following detailed description, taken in conjunction with the accompanying drawings, in which like reference characters refer to like parts throughout, and in which.

DETAILED DESCRIPTION

In a common implementation, a high-speed serial transceiver is divided into a physical medium attachment (PMA) portion or module which communicates with outside devices, and a physical coding sublayer (PCS) portion or module which performs serial processing of data, for transmission to, or that is received from, those outside devices. Interfaces to which the present invention may apply typically are part of the PCS, or are between the PCS and the programmable fabric of the programmable device. The PCS typically also communicates with the PMA.

The invention will now be described with reference to FIGS. 1-6. For simplicity, the description will refer to a PLD as an example of a programmable integrated circuit device, but the invention may be used with any programmable integrated circuit device. Similarly, the description will refer to PCI-Express ("PCIe") as an example of a stacked protocol, but the invention may be used with any stacked protocol.

Figure 1:
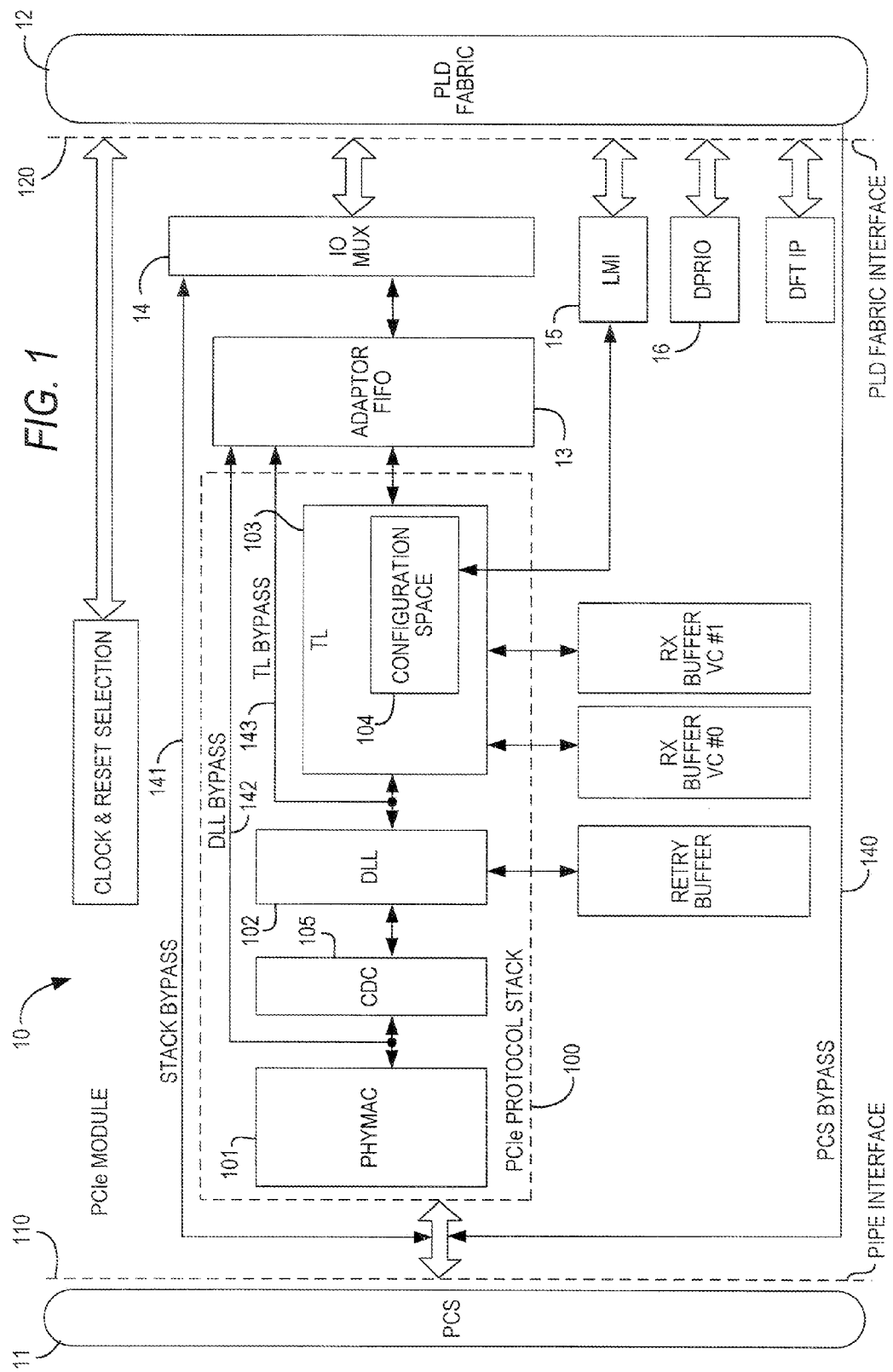
FIG. 1 shows a preferred embodiment of an interface according to the present invention, implemented for the PCI-Express protocol.

FIG. 1 shows a preferred embodiment of a PCIe-Express interface module 10 for a PLD, incorporating the present invention. Interface module 10 preferably connects to the outside world via PCS 11, to which it is connected by a PHY Interface for the PCI Express ("PIPE") Interface 110, which is described in "PHY Interface for the PCI Express™ Architecture" by Intel Corporation. Interface module 10 also preferably connects to the user-programmable "soft logic" of "fabric" 12 of the PLD via an appropriate interface 120. Module 10 preferably is hard logic, or "standard cell" logic, as opposed to the programmable logic of PLD fabric 12.

Module 10 includes protocol stack 100 which, in the case of PCIe, preferably includes at least a physical layer/media access control layer (PHYMAC) 101, a data link layer (DLL) 102, and a transaction layer (TL) 103. TL 103 may include a configuration space 104, used to configure the function within the device, that is controllable by TL packets with a configuration space address, or by user programming, operating in the PLD fabric 12, via local management interface (LMI) 15.

LMI 15 provides access for reading from and writing to configuration space 104 to enable status monitoring and debug capabilities. Accordingly, when TL 103 is bypassed as discussed below, LMI 15 is not active. Dynamic Partial Reconfigurable Input/Output (DPRIO) Interface 16 enables users to access a limited number of reconfigurable global configuration bits. As such, DPRIO 16 is a way to control I/O Mux 14 to control which layer is being selected. Typically the device is configured at power-up with a particular set of values for internal macro control.

Protocol stack 100 communicates, on the PLD fabric side, with adapter FIFO 13, which bridges any rate/timing gap between protocol stack 100 and speed of PLD fabric 12. While a synchronous timed interface could be used for that purpose, in a programmable device, where the relative speeds may not be known in advance, adapter FIFO 13 provides more flexibility. In addition, adapter FIFO 13 could be used as a simple phase-compensation FIFO.

An input/output multiplexer (IO Mux) 14 is provided between adapter FIFO 13 and PLD fabric interface 120. This block allows the same set of I/O signals to be used in the different modes of operation that are described below. Specifically, IO Mux 14 multiplexes the PCS/PMA I/O signals from the PHY layer and the I/O signals from module 10 (which contains the MAC, DLL and TL layers) onto the same interface. Because DLL 102 and TL 103 may operate at an intermediate rate between that of PCS 11 (and PHYMAC 101) and that of programmable fabric 12, a clock-domain-crossing (CDC) FIFO 105 may be provided between PHYMAC 101 and DLL 102.

Part or all of protocol stack 100 maybe selectively bypassed using one of PCS bypass 140, stack bypass 141, DLL bypass 142 and TL bypass 143. The desired bypass may be selected via user programming from fabric 12, or by the operation of user-defined circuitry in fabric 12. One of bypasses 140-143 may be used for debugging—i.e., to replace a faulty circuit in module 10 with soft logic instead of having to completely remake the device of which module 10 is a part, or to adapt new or optional features into module 10, or because the user has particular non-standard requirements. In addition, if a particular user application only required a portion of module 10, the remainder of module 10 may be bypassed to conserve power, which may be accomplished, for example, by clock gating the bypassed functions. Use of any of bypasses 140-143 results in the bypassing of all of module 10 beyond (e.g., to the right in FIG. 1) the particular bypass, rather than bypassing individual portions of module 10.

Figure 2:
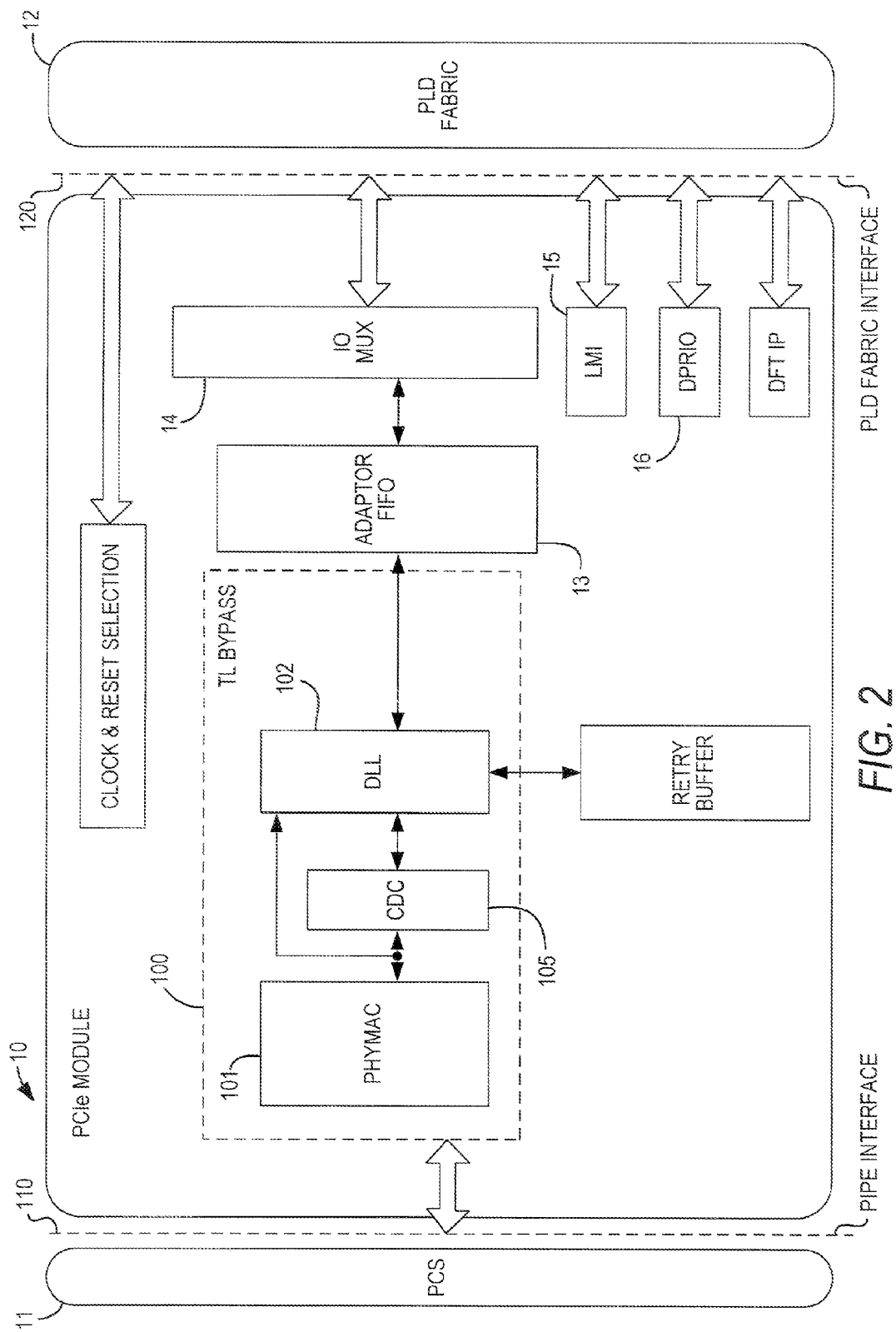
FIG. 2 shows a preferred embodiment of the interface of FIG. 1 with the transaction layer bypassed.

If TL bypass 143 is engaged, then module 10 operates as though it has the structure shown in FIG. 2, in which protocol stack 100 includes only PHYMAC 101, CDC 105 and DLL 102. DLL 102 communicates directly with fabric 12 via adapter FIFO 13 and IO Mux 14. This mode allows use of a custom transaction layer in soft logic 12, or the substitution of a future enhanced transaction layer which can be implemented in soft logic 12.

In normal operation, adapter FIFO 13 translates the 64-bit descriptor/data interface of TL 103, as well as all side application interfaces, into either a 64-bit data stream interface, or a 128-bit data stream interface with half the clock frequency. When TL Bypass 143 is engaged, adapter FIFO 13 translates the 64-bit data stream interface of DLL 102, as well as all side application interfaces, into the same 64-bit or 128-bit interface as in normal operation. Adapter FIFO 13 has an interface with protocol stack 100 that is clocked by the same clock—core_clk 611—as protocol stack 100, and an interface with I/O Mux 14 that is clocked by pld_clk 609. The relationship between the two clocks may be unknown but should have constant phase. Preferably, pld_clk 609 runs at either the same clock frequency, or one-half the clock frequency, as core_clk 611.

Figure 3:
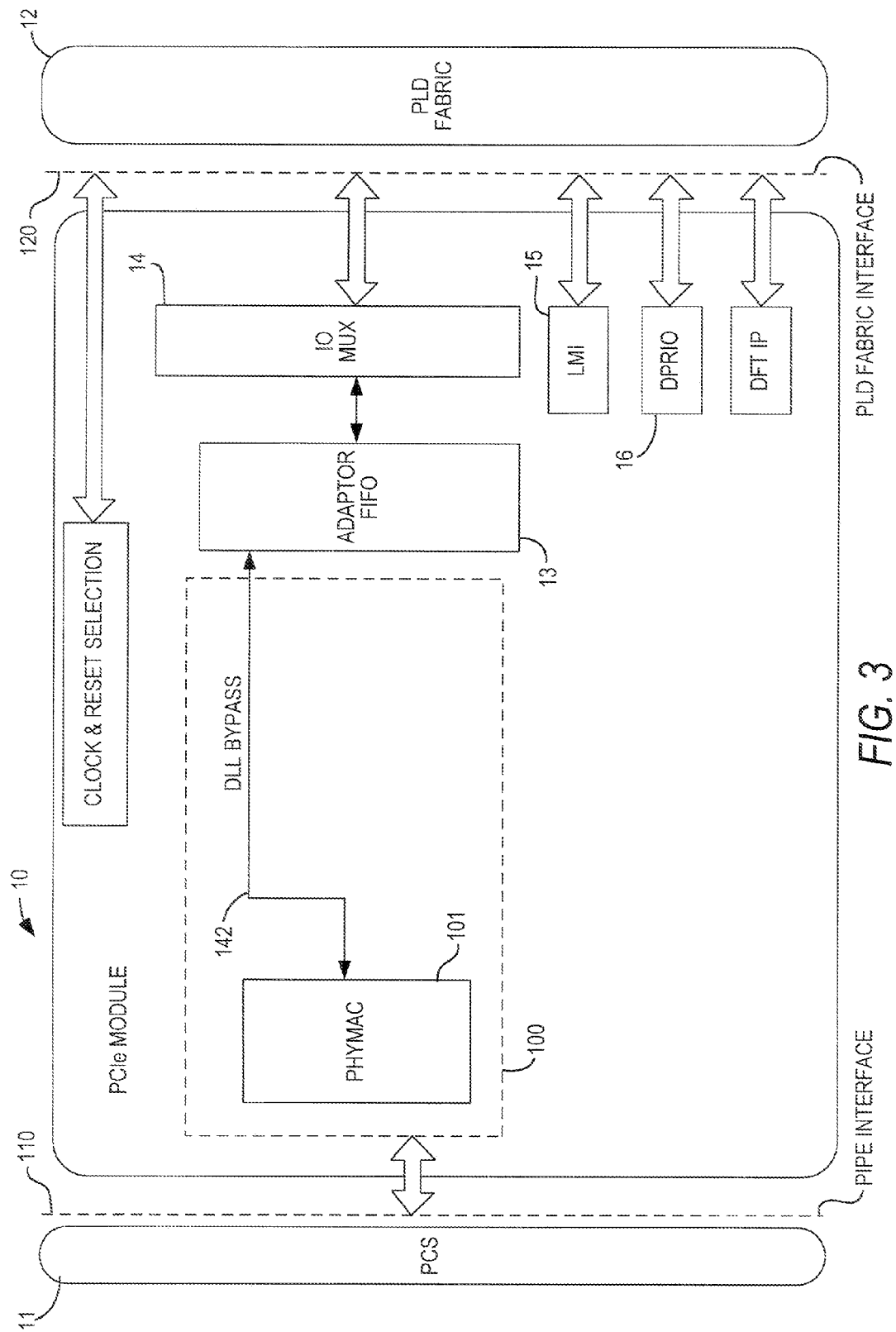
FIG. 3 shows a preferred embodiment of the interface of FIGS. 1 and 2 with the transaction layer and the data link layer bypassed.

If DLL bypass 142 is engaged, then module 10 operates as though it has the structure shown in FIG. 3, in which protocol stack 100 includes only PHYMAC 101, which communicates directly with fabric 12 via adapter FIFO 13 and IO Mux 14. This mode allows use of custom data link and transaction layers in soft logic 12, or the substitution of a future enhanced data link layer, or future enhanced data link and transaction layers, which can be implemented in soft logic 12.

This may be particularly useful in implementing PCI-Express Lite. The main function of PHYMAC 101 typically is to provide a mechanism to establish a communication link between devices. This functionality could be used to form a basic link for streaming data between devices without the need for DLL 102 and TL 103, which typically control data integrity and flow control. A particular application may not impose such requirements or have more stringent requirements, depending on the application and the intended function. Instead of devising a totally new proprietary protocol, the basic building blocks of a PCIe interface from module 10 may be reused, taking advantage of some of the reduced power consumption and die area provided by module 10.

Figure 4:
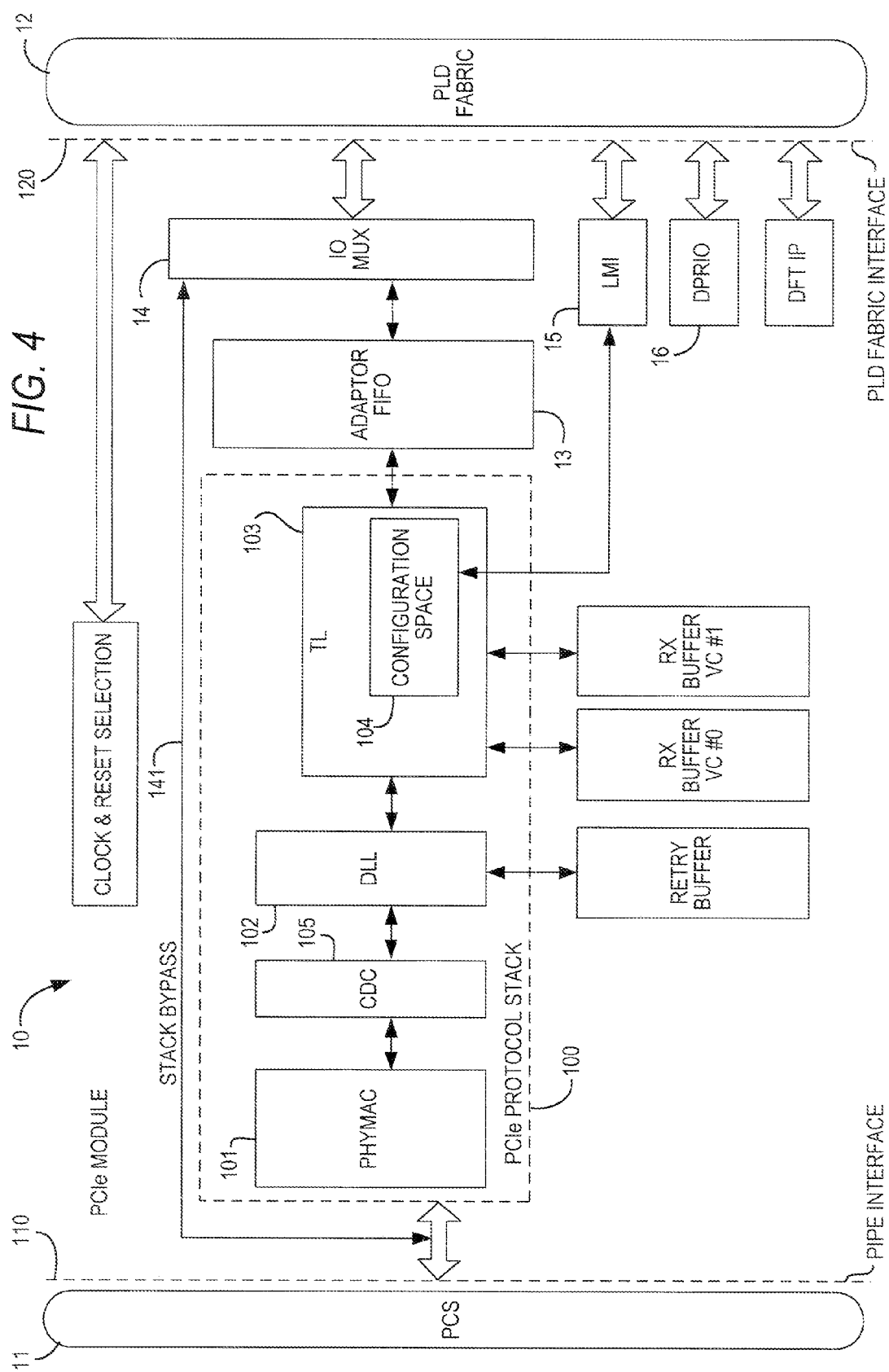
FIG. 4 shows a preferred embodiment of the interface of FIGS. 1-3 with all layers bypassed.

If module bypass 141 is engaged, then module 10 operates as though it has the structure shown in FIG. 4, in which protocol stack 100 is completely bypassed, with PCS 11 communicating directly with PIPE Interface 120 of fabric 12. Adapter FIFO 13 is not used. Instead, preferably a phase compensation FIFO (not shown) in PCS 11 is used. However, IO Mux 14 still is used, using the same path into fabric 12. This mode allows for the use of custom protocol layers for all layers of the protocol, or even the substitution of another protocol altogether in soft logic in place of hard logic PCIe module 10, as well as future enhancements of PCIe.

Figure 5:
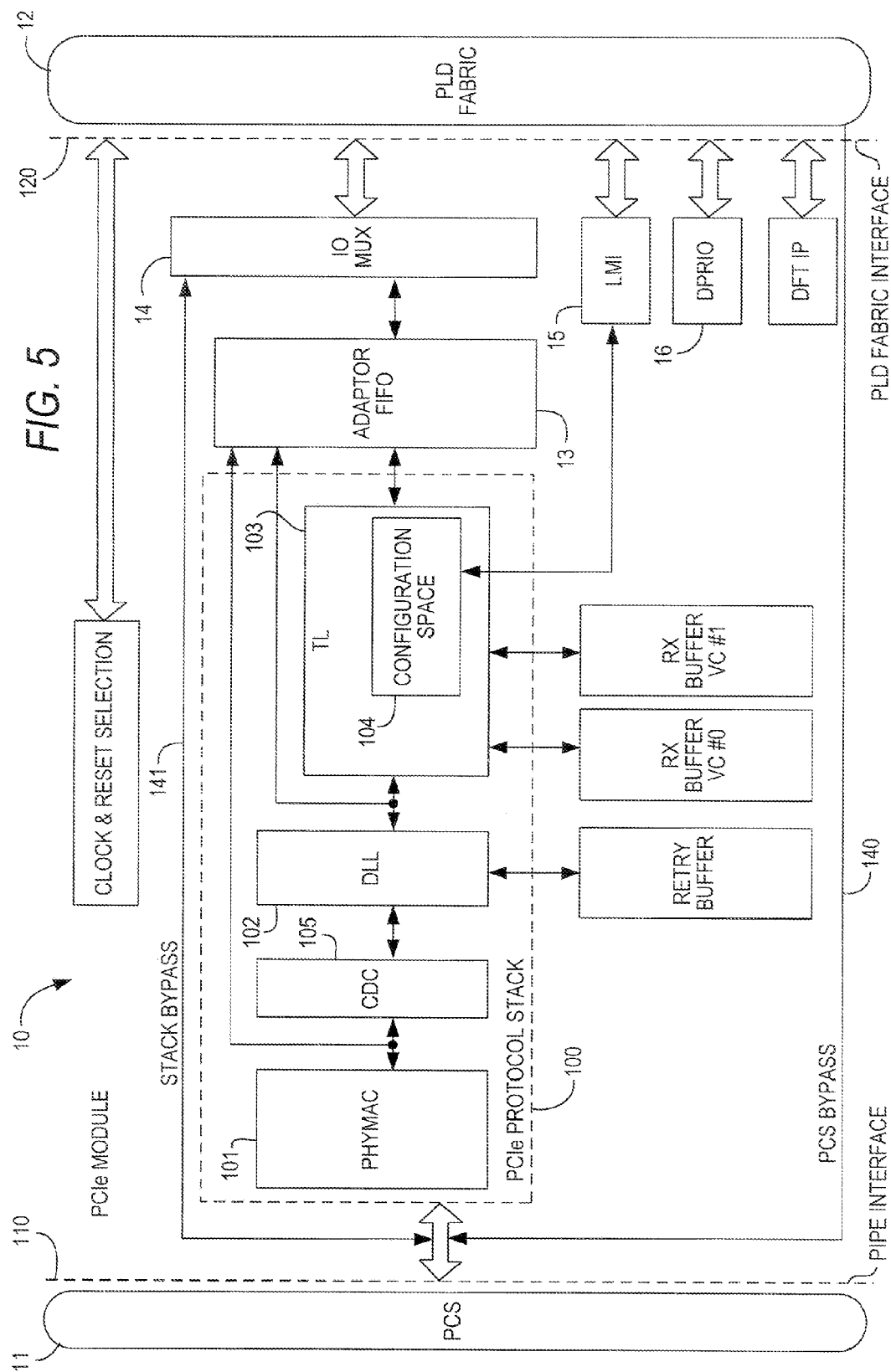
FIG. 5 shows a preferred embodiment of the present invention in which the entire interface is bypassed.

In some situations, the user may need to provide custom I/O interfaces in PLD fabric 10 to replace the hard PMA/PCS circuitry on the device, but may still want to use stacked protocol module 10. Such a situation is shown in FIG. 5 in which PCS bypass or "reverse bypass" 140 is used to bring data from the user's custom interface (not shown) in PLD fabric 12 to protocol stack 100. At that point, the entire protocol stack 100 may be used, or any of the aforementioned bypass modes also may be used.

The selection of the various bypasses 140-143 may be accomplished by a 1:2 diplexer at the output of each stage of module 10. That diplexer (not shown) would direct the output either to the next stage, or to the respective bypass.

Figure 6:
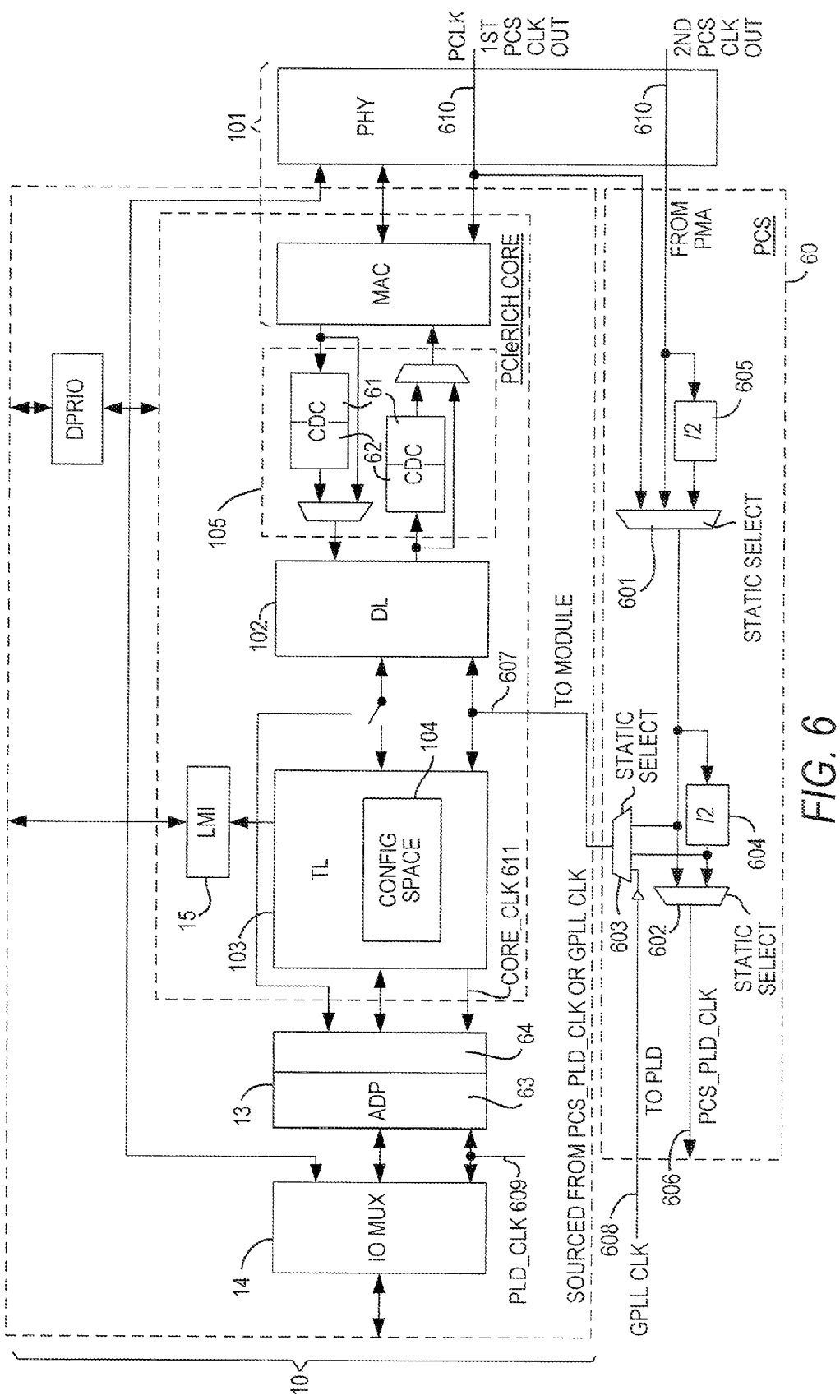
FIG. 6 shows a preferred embodiment of a clock distribution arrangement in accordance with the present invention.

FIG. 6 shows how clocks are distributed to the different clock domains within PCI-Express module 10. In this drawing, the PMA/PCS are on the right and the PLD fabric is on the left. As discussed above, the physical layer components 101 may operate at a first speed reflecting conditions outside the PLD, while IO Mux 14 has to operate at substantially the speed of the PLD fabric 12, and data link layer 103 and transaction layer 103 may operate at a third speed, intermediate to the other two speeds. As also discussed above, CDC 105 may bridge the first and third speeds and adapter FIFO (ADP) 13 may bridge the third and second speeds. Thus, CDC 105 may have a portion 61 operating at the first speed and a portion 62 operating at the third speed. Similarly, adapter FIFO 13 may have a portion 63 operating at the second speed and a portion 64 operating at the third speed.

As further seen in FIG. 6, one or more clocks 610 may be supplied from the PMA to PCS 60 as well as directly to physical layer components 101 at the first speed. Via multiplexers 601, 602, 603 and dividers 604, 605, one or more of those clocks may be provided in their original or divided down form both to PLD fabric 12 at 606 and to module 10 at 607 at the third speed. Third speed 607 may also be supplied from PLD fabric 12 at 608 via multiplexer 603. Similarly, a clock (the same as or different from clock 608) may be provided from PLD fabric 12 at 609 at the second speed.

Figure 7:
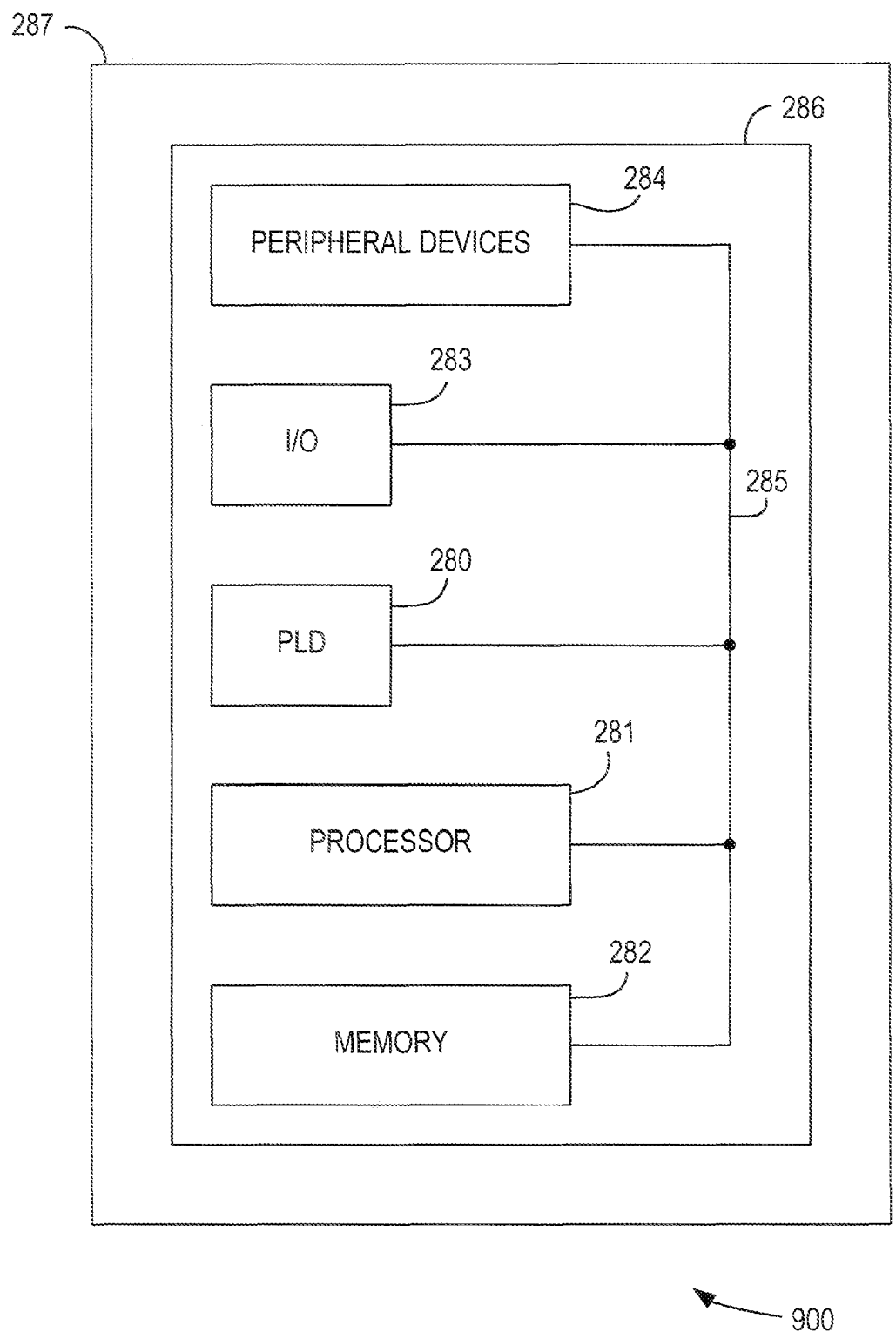
FIG. 7 is a simplified block diagram of an illustrative system employing a programmable logic device incorporating the present invention.

A PLD 280 incorporating an interface module 10 according to the present invention may be used in many kinds of electronic devices. One possible use is in a data processing system 900 shown in FIG. 7. Data processing system 900 may include one or more of the following components: a processor 281; memory 282; I/O circuitry 283; and peripheral devices 284. These components are coupled together by a system bus 285 and a circuit board 286 which is contained in an end-user system 287.

System 900 can be used in a wide variety of applications, such as computer networking, data networking, instrumentation, video processing, digital signal processing, or any other application where the advantage of using programmable or reprogrammable logic is desirable. PLD 280 can be used to perform a variety of different logic functions. For example, PLD 280 can be configured as a processor or controller that works in cooperation with processor 281. PLD 280 may also be used as an arbiter for arbitrating access to a shared resources in system 900. In yet another example, PLD 280 can be configured as an interface between processor 281 and one of the other components in system 900. It should be noted that system 900 is only exemplary, and that the true scope and spirit of the invention should be indicated by the following claims.

Various technologies can be used to implement PLDs 280 as described above and incorporating this invention.

Thus it is seen that a stacked protocol interface that is configurable to allow it to operate with a wide range of possible user configurations, as well as data rate differences, has been provided. Although the invention has been described in the context of PLDs, it applies to any programmable integrated circuit device as described above.

It will be understood that the foregoing is only illustrative of the principles of the invention, and that various modifications can be made by those skilled in the art without departing from the scope and spirit of the invention. For example, the various elements of this invention can be provided on a PLD in any desired number and/or arrangement. One skilled in the art will appreciate that the present invention can be practiced by other than the described embodiments, which are presented for purposes of illustration and not of limitation, and the present invention is limited only by the claims that follow.

What is claimed is:

1. Stacked protocol interface circuitry for a programmable integrated circuit device having a programmable logic portion, wherein:
    said stacked protocol interface circuitry is hard logic on said programmable integrated circuit device that is separate from, and connected to, said programmable logic portion of said programmable integrated circuit device;
    said stacked protocol interface circuitry comprises:
    a protocol stack module, implemented in hard logic, including a plurality of stages for respective protocol layers progressing from a stack input to a stack output, each said layer stage having a layer stage input and a layer stage output,
    a respective selectable bypass at said layer stage input of each of at least one of said layer stages, and programmable selection circuitry coupled to the respective selectable bypass; and
    signals arriving at said layer stage input are selectably directed to one of (a) said respective layer stage, and (b) said respective bypass.

2. The stacked protocol interface circuitry of claim 1 wherein said programmable integrated circuit device is a programmable logic device.

3. The stacked protocol interface circuitry of claim 1 further comprising:
    at least one clock domain adapter between layer stages of said protocol stack; and
    clock distribution circuitry that distributes at least a first clock upstream of said clock domain adapter and at least a second clock downstream of said clock domain adapter.

4. The stacked protocol interface circuitry of claim 1 further comprising:
    a rate adapter module at said stack output; wherein:
    at least one said respective bypass terminates at said rate adapter module.

5. The stacked protocol interface circuitry of claim 4 wherein each said respective bypass terminates at said rate adapter module.

6. The stacked protocol interface circuitry of claim 4 further comprising clock distribution circuitry for distributing at least a first clock upstream of said rate adapter module and at least a second clock downstream of said rate adapter module.

7. The stacked protocol interface circuitry of claim 6 further comprising:
    at least one clock domain adapter between layer stages of said protocol stack; wherein:
    said clock distribution circuitry distributes one of said at least a first clock upstream of said clock domain adapter and another of said at least a first clock downstream of said clock domain adapter and upstream of said rate adapter module.

8. The stacked protocol interface circuitry of claim 4 further comprising:
    an output multiplexer downstream of said rate adapter module and having an output connected to said programmable logic portion of said programmable integrated circuit device; and
    an additional selectable bypass at said stack input; wherein:
    a first input of said output multiplexer is an output of said rate adapter module; and a second input of said output multiplexer is said additional selectable bypass.

9. The stacked protocol interface circuitry of claim 1 wherein said stacked protocol interface circuitry further comprises a reverse bypass that conducts signals from said programmable logic portion of said programmable integrated circuit device to said stack input.

10. The stacked protocol interface circuitry of claim 1 wherein each said respective selectable bypass terminates at said stack output.

11. A method of operating stacked protocol interface circuitry on a programmable integrated circuit device having a programmable logic portion, wherein said stacked protocol interface circuitry is hard logic on said programmable integrated circuit device that is separate from, and connected to, said programmable logic portion of said programmable integrated circuit device, said method comprising:
  providing stacked protocol interface circuitry having a protocol stack module, implemented in hard logic, including a plurality of stages for respective protocol layers progressing from a stack input to a stack output, each said layer stage having a layer stage input and a layer stage output, a respective selectable bypass at said layer stage input of each of at least one of said layer stages, and programmable selection circuitry coupled to the respective selectable bypass, wherein signals arriving at said layer stage input are selectably directed to one of (a) said respective layer stage, and (b) said respective bypass;
  selectively bypassing at least one of said layer stages using one said respective selectable bypass; and
  providing an alternate for each said least one bypassed layer stage in said programmable logic portion of said programmable integrated circuit device.

12. The method of claim 11 wherein:
  there is at least one clock domain adapter between layer stages of said protocol stack module; said method further comprising:
  distributing at least a first clock upstream of said clock domain adapter and at least a second clock downstream of said clock domain adapter.

13. The method of claim 11 wherein:
  there is a rate adapter module at said stack output; and
  at least one said respective bypass terminates at said rate adapter module; said method further comprising:
  distributing at least a first clock upstream of said rate adapter module and at least a second clock downstream of said rate adapter module.

14. The method of claim 13 wherein:
  there is at least one clock domain adapter between layer stages of said protocol stack module; said method further comprising:
  distributing one of said at least a first clock upstream of said clock domain adapter and another of said at least a first clock downstream of said clock domain adapter and upstream of said rate adapter module.

15. Stacked protocol interface circuitry for a programmable integrated circuit device having a programmable logic portion, wherein:
  said stacked protocol interface circuitry is hard logic on said programmable integrated circuit device that is separate from, and connected to, said programmable logic portion of said programmable integrated circuit device;
  said stacked protocol interface circuitry comprises:
  a protocol stack module, implemented in hard logic, including a physical layer stage, a data link layer stage and a transaction layer stage progressing from a stack input to a stack output, each said layer stage having a layer stage input and a layer stage output,
  a respective selectable bypass at said layer stage input of each of said layer stages, and programmable selection circuitry coupled to the respective selectable bypass;
  signals arriving at said layer stage input are selectably directed to one of (a) said respective layer stage, and (b) said respective bypass; and
  each said respective bypass terminates downstream of all said layer stages.

16. The stacked protocol interface circuitry of claim 15 wherein said programmable integrated circuit device is a programmable logic device.

17. The stacked protocol interface circuitry of claim 15 further comprising:
  at least one clock domain adapter between said physical layer stage and said data link layer stage of said protocol stack module; and
  clock distribution circuitry that distributes at least a first clock upstream of said clock domain adapter and at least a second clock downstream of said clock domain adapter.

18. The stacked protocol interface circuitry of claim 17 further comprising:
  a rate adapter module at said stack output; wherein:
  each said respective bypass terminates at said rate adapter module.

19. The stacked protocol interface circuitry of claim 18 wherein:
  said clock distribution circuitry distributes said second clock downstream of said clock domain adapter and upstream of said rate adapter module, and distributes a third clock downstream of said rate adapter module.

20. The stacked protocol interface circuitry of claim 18 wherein said stacked protocol interface circuitry further comprises:
  an output multiplexer downstream of said rate adapter module and having an output connected to said programmable logic portion of said programmable integrated circuit device; and
  an additional selectable bypass at said stack input; wherein:
  a first input of said output multiplexer is an output of said rate adapter module; and
  a second input of said output multiplexer is said additional selectable bypass.

21. The stacked protocol interface circuitry of claim 15 wherein said stacked protocol interface circuitry further comprises a reverse bypass that conducts signals from said programmable logic of said programmable integrated circuit device to said stack input.

22. The stacked protocol interface circuitry of claim 1 wherein the programmable selection circuitry is coupled between the respective selectable bypass and further programmable selection circuitry, and wherein the programmable selection circuitry comprises a diplexer.

* * * * *